United States Patent
Seo et al.

(10) Patent No.: US 8,052,957 B2
(45) Date of Patent: Nov. 8, 2011

(54) METHOD OF MANUFACTURING FLAKE ALUMINUM OXIDE USING MICROWAVE

(75) Inventors: Geum Seok Seo, Busan (KR); Hui Chan Bak, Busan (KR); Seong Soo Park, Busan (KR); Sang Geun Lee, Busan (KR); Kyeong Doo Ryou, Busan (KR); Tae Gun Kim, Gyeongsangnam-do (KR); Jin Sik Yoon, Busan (KR)

(73) Assignees: JPS Micro-Tech Co., Ltd. (KR); Geum Seok Seo (KR)

( * ) Notice: Subject to any disclaimer, the term of this patent is extended or adjusted under 35 U.S.C. 154(b) by 0 days.

(21) Appl. No.: 12/675,186

(22) PCT Filed: Aug. 28, 2008

(86) PCT No.: PCT/KR2008/005058
§ 371 (c)(1),
(2), (4) Date: Feb. 25, 2010

(87) PCT Pub. No.: WO2009/028888
PCT Pub. Date: Mar. 5, 2009

(65) Prior Publication Data
US 2011/0052485 A1    Mar. 3, 2011

(30) Foreign Application Priority Data

Aug. 31, 2007 (KR) .................. 10-2007-0088348

(51) Int. Cl.
*C01F 7/00* (2006.01)
(52) U.S. Cl. .................. 423/625; 423/111; 241/23
(58) Field of Classification Search .................. 423/625, 423/111; 241/23, 24.1; 209/3, 10, 11
See application file for complete search history.

(56) References Cited

U.S. PATENT DOCUMENTS

| 4,308,088 A | 12/1981 | Cherdron et al. |
| 2003/0185746 A1 | 10/2003 | Kajihara et al. |

FOREIGN PATENT DOCUMENTS

| JP | 62153118 A | 7/1987 |
| JP | 08206816 A | 8/1996 |
| JP | 08248436 A | 9/1996 |
| JP | 2000344516 A | 12/2000 |
| KR | 19990012197 A | 2/1999 |
| WO | 2004060804 A1 | 7/2004 |

OTHER PUBLICATIONS

Arindam De et al., "effect of green microstructure on microwave processing of alumina:effect of particle size", Ceramic Engineering and Science Proceedings, vol. 11, No. 9/10, 1990, p. 1743-1753.
Park et al., Journal of the Korean Ceramic Society, 39(5); 473-.478 (2002). (English translation of abstract only).
International Search Report, PCT/KR2008/005058.

*Primary Examiner* — Steven Bos
(74) *Attorney, Agent, or Firm* — Lerner, David, Littenberg, Krumholz & Mentlik, LLP

(57) ABSTRACT

The present disclosure suggests a method of manufacturing flake aluminum oxide using a microwave including: performing a pre-treatment on a starting material by grinding the starting material such as alumina hydrate, aluminum salt or the like and classifying particles with an appropriate size; manufacturing transition alumina by performing a heat treatment by means of heating the pre-treated starting material; mixing the transition alumina with molten salt and an additive and then dispersing and grinding the mixed compounds; melting and synthesizing flake aluminum oxide by heating the dispersed and grinded mixture with a microwave as a heating source; separating the molten salt and the additive from the synthesized aluminum oxide; and performing a post-treatment on the flake aluminum oxide by removing a foreign substance such as an additive residue stuck to a surface of a crystal particle of the separated flake aluminum oxide.

7 Claims, 6 Drawing Sheets

[Fig. 1]
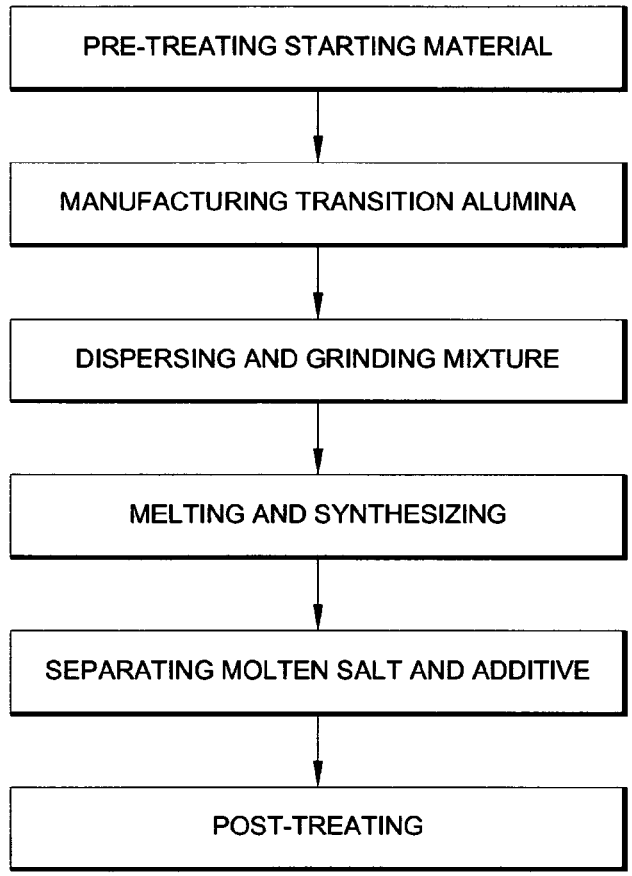
[Fig. 2]
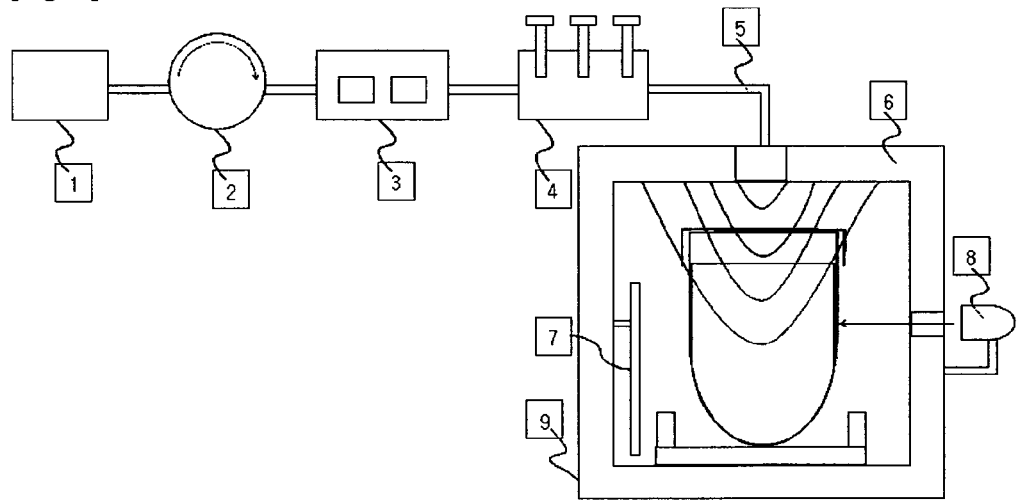

[Fig. 3]
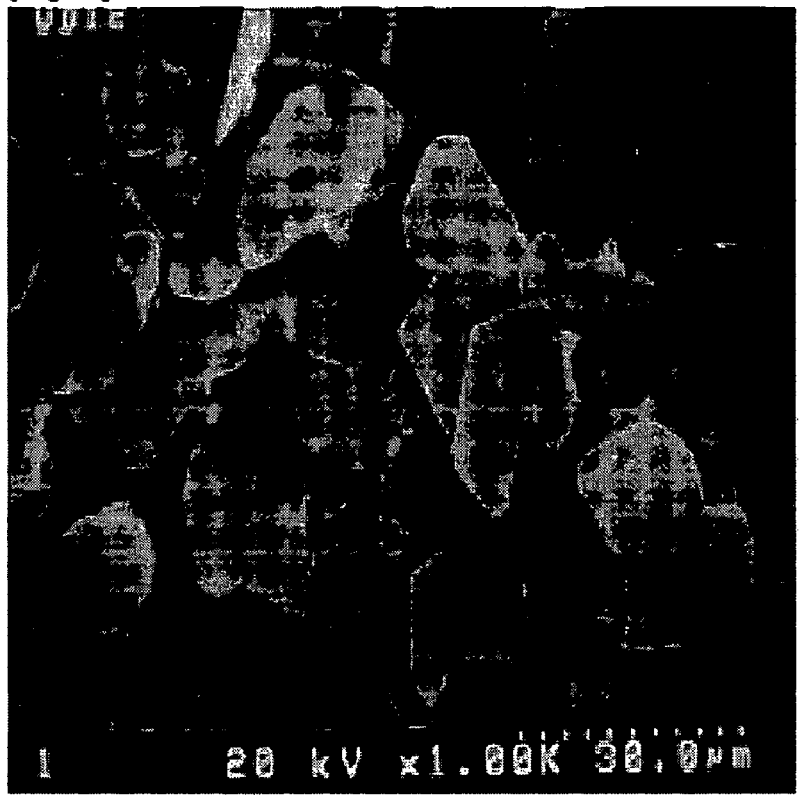
[Fig. 4]

[Fig. 5]
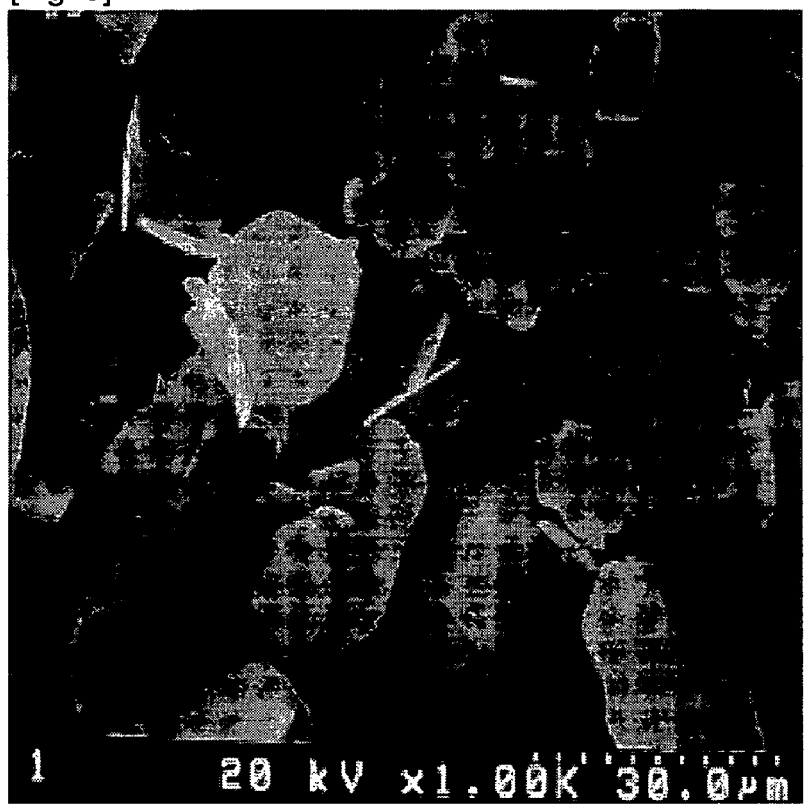
[Fig. 6]

[Fig. 7]
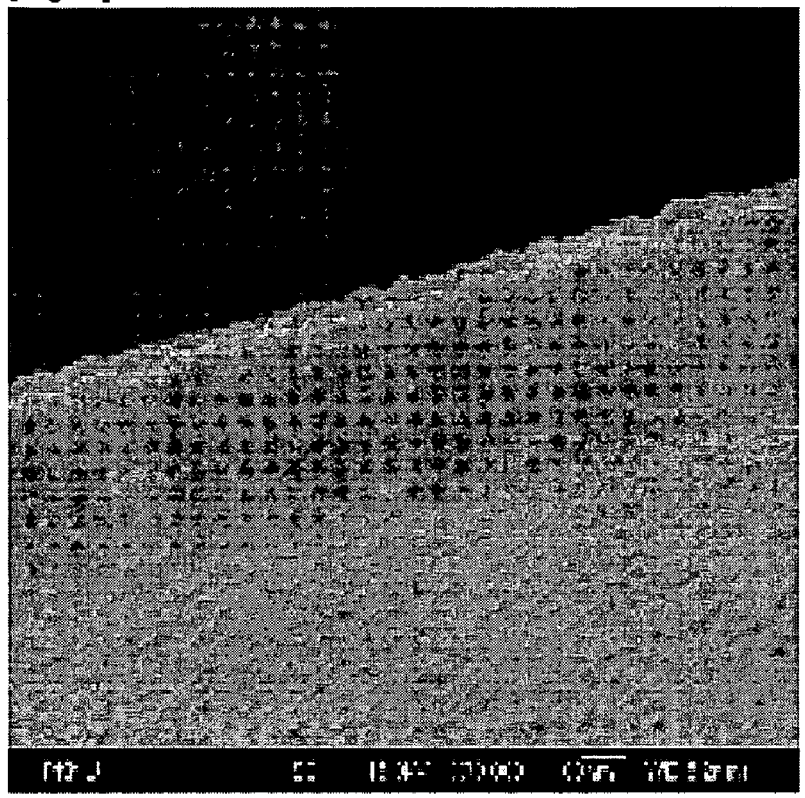
[Fig. 8]
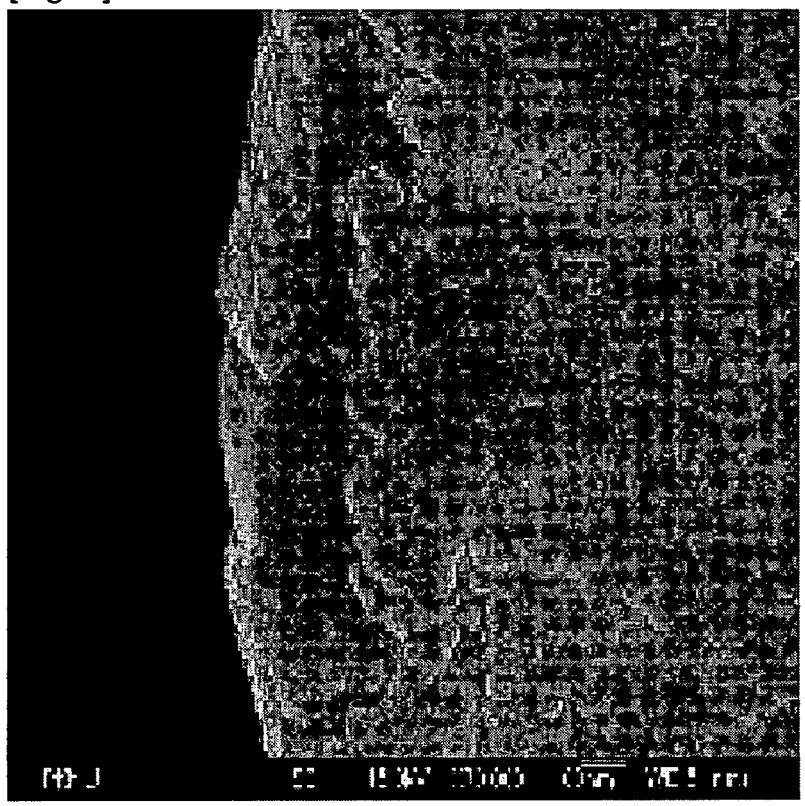

[Fig. 9]
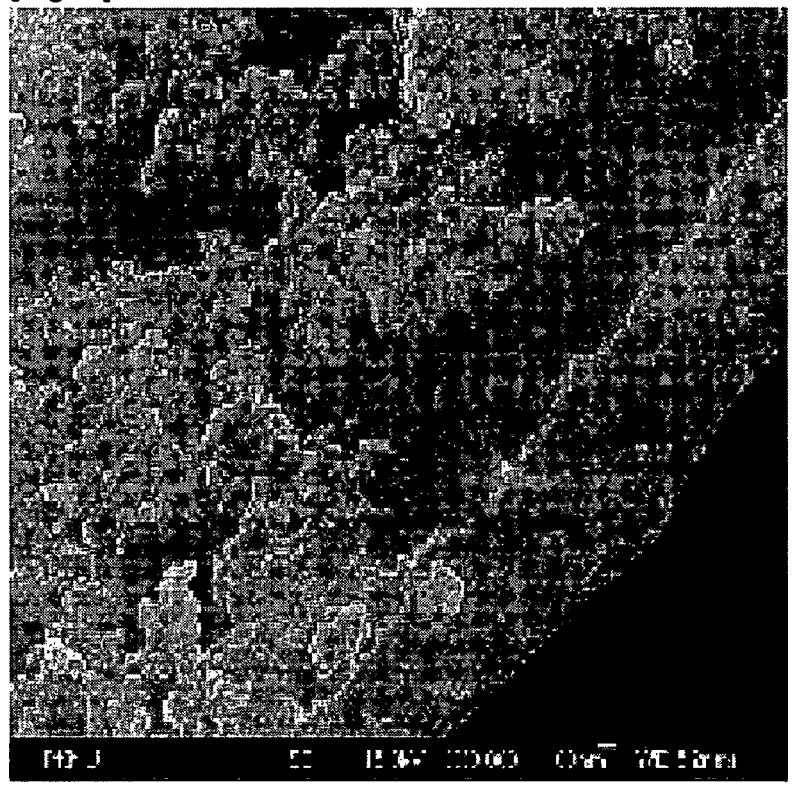
[Fig. 10]
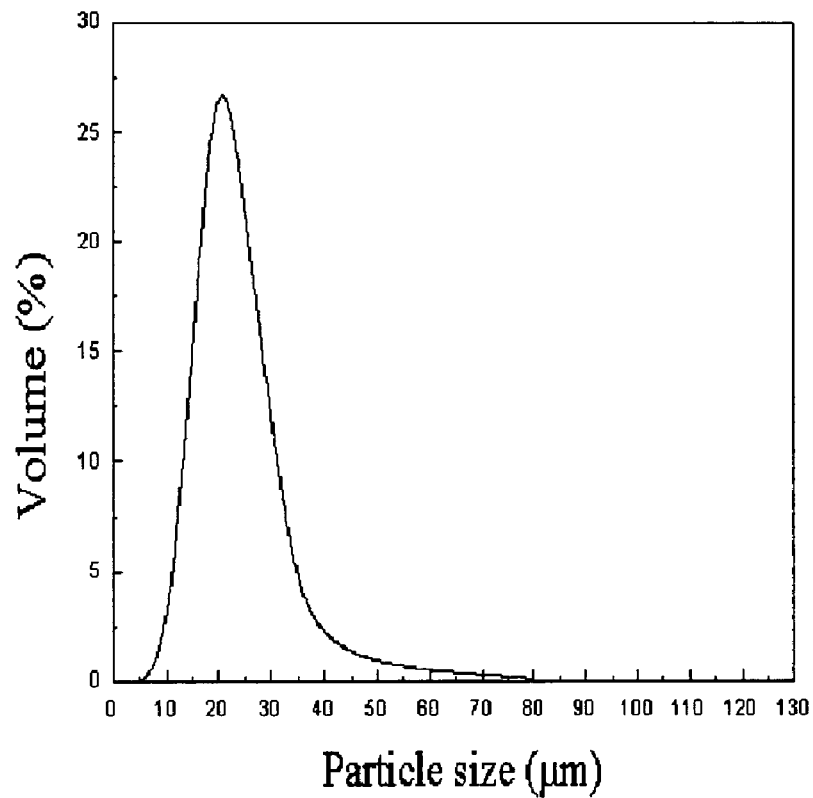

[Fig. 11]
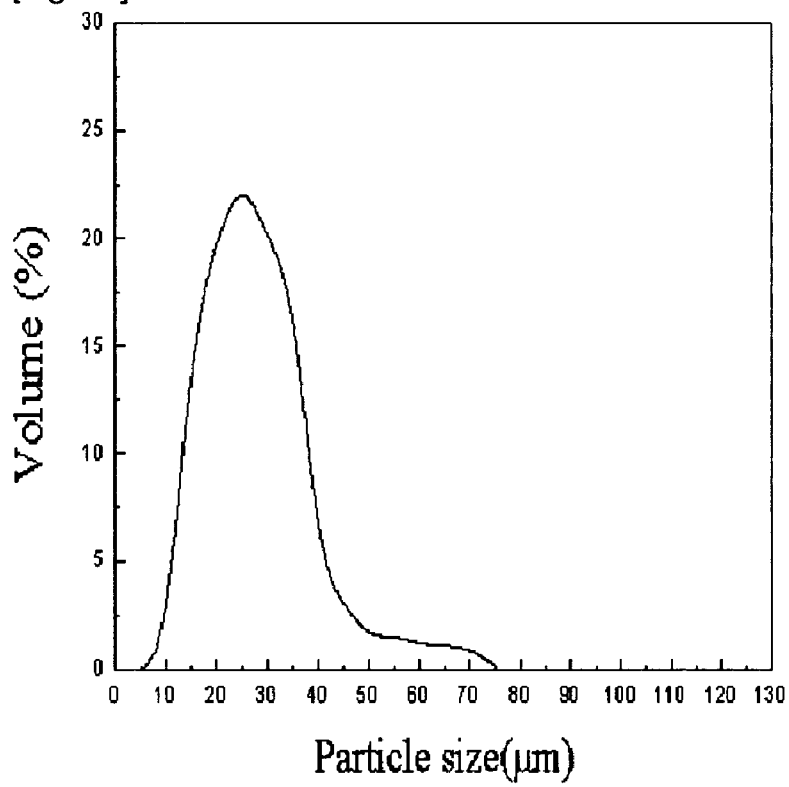
[Fig. 12]
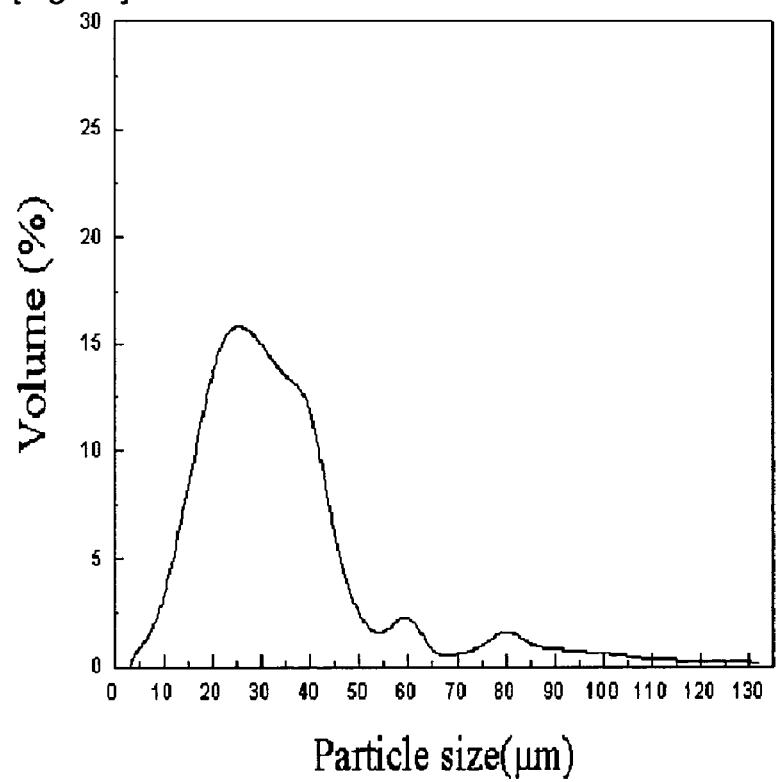

US 8,052,957 B2

METHOD OF MANUFACTURING FLAKE ALUMINUM OXIDE USING MICROWAVE

TECHNICAL FIELD

The present disclosure relates to a method of manufacturing flake aluminum oxide using a microwave as a heating source, in which the flake aluminum oxide having a high aspect ratio is synthesized by mixing a starting material such as aluminum hydroxide or the like with an additive for controlling crystal growth and an additive for improving a crystal deposition property when manufacturing pearlescent pigment. To be specific, the flake aluminum oxide has a high aspect ratio with a ratio of long axis to short axis corresponding to about 50 to 415, and has a high luster, and thus is appropriate for a base material of the pearlescent pigment used as a raw material of paint, plastic, ink, cosmetic and glaze.

BACKGROUND ART

Generally, flake aluminum oxide has a high industrial applicability since it has excellent wear resistance, corrosion resistance, heat radiation property, luster and the like. In particular, due to its excellent property in luster, it has been increasingly popular as a base material for pearlescent pigment.

In order for the flake aluminum oxide to be used as a base material for pearlescent pigment or the like, it should have a high chemical stability, a high aspect ratio and a flat surface. For this conformation, it is necessary to inhibit crystal of the flake aluminum oxide from growing toward a specific direction when the crystal grows.

There are typical methods of manufacturing aluminum oxide such as a Bayer method, a Verneuil method, a Czochralski method, a hydrothermal synthesis method, a molten salt method and the like. An advantage of the Bayer method, the Verneuil method or the Czochralski method is that it is possible to mass-produce aluminum oxide, but it is difficult to control a crystalline formation and a shape of powder to be uniform with these methods. Meanwhile, it is easy to manufacture flake aluminum oxide by the hydrothermal synthesis method and the molten salt method and easy to control a stable crystalline form and a shape of particle, so it has been known that these methods are appropriate for a commercial synthesis of flake aluminum oxide.

On examining related patents about a method of manufacturing of flake aluminum oxide, Japanese Patent Laid-open Publication No. H7-33110 discloses a method of manufacturing hexagonal plate shaped aluminum oxide by adding phosphoric acid ion as a crystal growth inhibitor in a hydrothermal synthesizing apparatus. Further, French Patent Laid-open Publication No. 2441584 discloses a method of manufacturing macro crystalline flake aluminum oxide crystal powder having a diameter of 10 to 200 µm and an aspect ratio of 7 by performing a reaction using aluminum hydroxide as a raw material of alumina and cryolite as flux at a temperature of 1200 to 1450° C. Furthermore, Korean Patent Publication No. 1996-64 discloses a method of synthesizing aluminum oxide gel powder by performing a reaction with $AlF_3$ gas at a high temperature.

However, the above-mentioned typical methods have some problems as follows. In other words, it is possible to synthesize thin flake aluminum oxide at a comparatively low temperature by a hydrothermal synthesis method but because a high-temperature and high-pressure hydrothermal synthesis apparatus is needed for an industrial mass-synthesis, it is a very cost-consuming method, and since the powder synthesized by the hydrothermal synthesis method has a particle size of 20 µm or less, it is not appropriate for a base material for pearlescent pigment.

Furthermore, as for a vapor reaction in which a starting material and an additive are reacted in the vapor state, it is possible to lower a synthesis temperature by 100° C. or more in comparison with a flux method using molten salt. But this method needs an expensive apparatuses for making the additive vaporized and for controlling an appropriate atmosphere for the synthesis and further needs an expensive electric furnace to control sintering under the controlled atmosphere. Therefore, this method is not appropriate for an industrial mass production.

A flux method using a molten salt is a method for growing crystal of the solute in a molten salt molten at a high temperature, wherein the molten salt promotes a synthetic reaction of oxide and accelerate an aeolotropy of a particle and further lower a crystallization temperature by 100 to 200° C. Since the molten salts are very important in synthetically manufacturing flake aluminum oxide by this method, it is essential for selecting an appropriate molten salt. When flake aluminum oxide is synthesized by this flux method, it is possible to synthesize powder in a temperature of 1250 to 1450° C., and to synthesize macro crystalline powder having a particle size of 20 µm or more.

International Publication No. WO 2004/060804 discloses a process of producing flake aluminum oxide by using a molten salt method, specifically by adding molten salts such as metal fluorides or the like and additives. But in case of manufacturing flake aluminum oxide with this method, it is necessary to carry out a heat treatment for a long period of time at a high temperature of 1,250° C. or more and in case of a mass production, it is impossible to perform a uniform heating due to the difference of temperature gradients in a crucible and thus it is hard to obtain flake aluminum oxide having a uniform particle size distribution in which multi-crystal and twin-crystal are 5% or less.

In this connection, the present applicant has disclosed a thesis on "a microwave synthesis of alpha ($\alpha$) aluminum plate shaped body by a flux method" (Journal of The Korean Ceramic Society, Vol. 39, No. 5, pp. 473-478, 2002) in order to solve the above-mentioned problems. Such a microwave synthesis method uses a frequency of 2.45 GHz, so it is possible to quickly generate heat at an early stage. However, the microwave is penetrated too short to generate the heat within a material itself. Therefore, when a large quantity of a material is heated with such the microwave synthesis method, there may occur differences in temperature between a surface and an inside of the material due to a low penetration depth so when the microwave synthesis method is applied to the large quantity of a material it is hard to obtain a uniform particle size distribution due to the difference of crystal growth due to a temperature gradient between the surface and the inside. Accordingly, the microwave synthesis method using the frequency of 2.45 GHz is not appropriate for an industrial mass production.

DISCLOSURE OF INVENTION

Technical Problem

In view of the foregoing, the present disclosure provides a method of manufacturing flake aluminum oxide using a microwave, in which a starting material is made into a precursor by performing a heat treatment by a method originated from the present inventor thereon, and macro crystalline flake aluminum oxide powder having a high aspect ratio is synthesized by performing a physical treatment on the precursor mixed with an additive, thereby suppressing a growth of multi-crystal and twin-crystal resulting in a simplification of the manufacturing method and an improvement of product yield.

Further, the present disclosure provides a method of manufacturing flake aluminum oxide using a microwave, in which a synthesizing method of adding a tin compound which is a new material to transition alumina is performed, which has never been tried in the technical field of the present disclosure, so that a deposition property of a nanoparticle and a chemical stability are improved when manufacturing pearlescent pigment.

In addition the present disclosure has still another purpose to provide a method of manufacturing flake aluminum oxide using a microwave at 915 MHz as a heating source, thereby sharply reducing a synthesis time and improving a productivity and an energy efficiency and further manufacturing the flake aluminum oxide having a uniform particle size distribution. That is, in comparison with a typical heating and synthesizing method using a thermal convection in an electric furnace, this dielectric heating method using the microwave makes it possible to generate heat within a material itself and for the microwave to penetrate deeply into the material so as to uniformly heat the material. Therefore, if a large quantity of material is heated, there may not occur a temperature gradient within a crucible.

In accordance with a typical synthesis method, it is possible to synthesize aluminum oxide by injecting a microwave at 2.45 GHz in a small crucible in an experimental method, but when using this method a limited penetration depth causes temperature irregularities within a material which result in a low mono-dispersion property of a particle size and an increase of a non-uniform aspect ratio. Meanwhile, the present disclosure suggests using a microwave at 915 MHz having an effective penetration depth about three times as great as that at a frequency of 2.45 GHz, so it is appropriate for an industrial mass production which uses a large crucible.

Technical Solution

In accordance with an embodiment of the present invention, there is provided a method of manufacturing flake aluminum oxide including: performing a pre-treatment on a starting material by grinding the starting material such as alumina hydrate, aluminum salt or the like and classifying particles with an appropriate size; manufacturing transition alumina by performing a heat treatment by means of heating the pre-treated starting material; mixing the transition alumina with molten salts and additives and then dispersing and grinding the mixed compounds; melting and synthesizing the flake aluminum oxide by heating the dispersed and grinded mixture with a microwave heating source; separating the molten salt and the additive from the synthesized aluminum oxide; and performing a post-treatment on the flake aluminum oxide by removing a foreign substance such as an additive residue stuck to a surface of a crystal particle of the separated flake aluminum oxide.

BRIEF DESCRIPTION OF THE DRAWINGS

FIG. 1 illustrates a schematic flow chart showing a method of manufacturing flake aluminum oxide in accordance with the present invention;

FIG. 2 offers a cross-sectional view of a microwave heating source in accordance with the present invention;

FIG. 3 provides a photo of synthesized powder taken by a SEM in accordance with Embodiment 1 of the present invention;

FIG. 4 provides a photo of synthesized powder taken by a SEM in accordance with Embodiment 3 of the present invention;

FIG. 5 provides a photo of synthesized powder taken by a SEM in accordance with Comparison Example 1 of the present invention;

FIG. 6 provides a photo of synthesized powder taken by a SEM in accordance with Comparison Example 2 of the present invention;

FIG. 7 offers a photo of synthesized flake aluminum oxide coated with $TiO_2$ particles taken by a SEM in accordance with Embodiment 1 of the present invention;

FIG. 8 offers a photo of synthesized flake aluminum oxide coated with $TiO_2$ particles taken by a SEM in accordance with Embodiment 3 of the present invention;

FIG. 9 offers a photo of synthesized flake aluminum oxide coated with $TiO_2$ particles taken by a SEM in accordance with Comparison Example 2 of the present invention;

FIG. 10 illustrates a result of particle size analysis of synthesized flake aluminum oxide in accordance with Embodiment 3 of the present invention;

FIG. 11 illustrates a result of particle size analysis of synthesized flake aluminum oxide in accordance with Embodiment 4 of the present invention; and FIG. 12 illustrates a result of particle size analysis of synthesized flake aluminum oxide in accordance with Comparison Example 2 of the present invention.

MODE FOR THE INVENTION

A method of manufacturing flake aluminum oxide with a microwave in accordance with the present disclosure for accomplishing the above-mentioned purposes will be explained in detail with reference to the accompanying FIG. 1. The method of manufacturing the flake aluminum oxide is as follows:

i) step of pre-treatment on a starting material by grinding the starting material such as alumina hydrate, aluminum salt or the like and classifying particles with an appropriate size;

ii) step of manufacturing transition alumina by performing a heat treatment by means of heating the pre-treated starting material;

iii) step of mixing the transition alumina with molten salts and additives and then dispersing and grinding the mixed compounds;

iv) step of melting and synthesizing the flake aluminum oxide by heating the dispersed and grinded mixture in use of a microwave as a heating source;

v) step of separating the molten salt and the additive from the synthesized aluminum oxide; and vi) step of performing a post-treatment on the flake aluminum oxide by removing a foreign substance such as an additive residue stuck to a surface of a crystal particle of the separated flake aluminum oxide.

Hereinafter, the method of manufacturing the flake aluminum oxide in accordance with the present disclosure will be explained in detail.

In step i), it is desirable to use aluminum hydroxide ($Al(OH)_3$) as the starting material and it is desirable to select and use any one of aluminum sulfate ($Al_2(SO_4)_3 \cdot 4{\sim}18H_2O$), aluminum nitrate ($Al(NO_3)_3 \cdot 9H_2O$) or aluminum acetate ($Al(CHCOO)_3OH$) as the aluminum salt.

A selection and a preparation of the starting material need to be carried out in a delicately attended manner so as to prevent multi-crystal and twin-crystal, which are also important components of the present disclosure, from being contained in the synthesized powder particle.

It has been known that the multi-crystal is formed depending on a status of a micro powder particle of the starting material and a dispersion status of the additive. Especially, if the micro powder particle of the starting material is not single-crystal but multi-crystal, it has a great effect thereon so that the multi-crystal is formed.

Although the formation of the multi (twin) crystal appears due to the status of micro powder particle of the starting material and the dispersion status of the additive, it appears mainly due to crystal growth in a twin formation by an effect of excessive crystal growth with respect to some portions of particle of the starting material when a dispersion of the additive is insufficient.

Meanwhile, it is very important to select an appropriate particle size of the starting material in order to manufacture flake aluminum oxide having a good mono-dispersion property with an aspect ratio of about 50 to 415 and a particle size of about 5 to 85 μm. An appropriate particle size of the starting material in accordance with the present disclosure is about 5 to 50 μm, and desirably, about 5 to 25 μm.

In order to limit the size of the above-mentioned starting material and prepare the size-controlled starting material, it is necessary to check a shape of the starting material powder particle by using a scanning electron microscope (SEM), and the particle should be mono-crystal having a particle size of about 5 to 50 μm and a proportion of the multi-crystal should be 5% or less.

In case the proportion of the multi-crystal is above 5%, when a final synthesis is completed, it becomes complicated to remove the multi-crystal particles from the completed powder after the molten salts and the additives are separated. Further, in order to completely remove them, a loss of the well-grown mono-crystalline powder can be incurred more than necessary.

Further, when classifying a particle size of the starting material into about 5 to 50 μm, a typical sieving method can be used and a mesh size for the upper part of a sieve is about 53 μm (270 Mesh) and about 10 μm for the lower part thereof. It is possible to use a typical rotary vibration sieve or Dalton sieve as a sieving apparatus and also possible to perform the sieving process by dry sieving or wet sieving.

The limitation on the particle size of the starting material to about 5 to 50 μm is purposed to maximize the efficiency during a grinding process. Therefore, if the particle size is more than about 50 μm, it is possible to cause a decrease in a grinding efficiency, and while manufacturing final powder, it can grow to macro crystal. If the particle size is less than about 5 μm, the starting material may be grinded to fine particles and thus while manufacturing the final powder, it is possible to form undesirably small crystal.

Accordingly, it is possible to obtain designed flake aluminum oxide powder having a particle size distribution with a high mono-dispersion property only by limiting the particle size of the starting material to about 5 to 50 μm.

The classified starting material having a particle size of about 5 to 50 μm is grinded into particles having a particle size of about 1 to 20 μm using a ball-mill. This grinding process using the ball-mill is performed to separate mono-crystal from multi-crystal contained in a very small quantity and to mono-disperse a size distribution of finally synthesized powder within about 5 to 85 μm.

The grinding process using the ball-mill is performed under a condition that a ball-mill jar in which a high-purity alumina crucible is installed is filled with high-purity zirconia balls or high-purity alumina balls up to about 30 to 70% of an inner volume and a starting material up to about 20 to 40% of an inner volume, and then a dry grinding is carried out.

The above-mentioned inner volume is set to maximize an efficiency of grinding the starting material into about 1 to 20 μm and it is more desirable to fill the inner volume of the ball-mill jar with the zirconia balls or the alumina balls up to about 50 to 60% and the starting material up to about 30 to 40%.

The mixture in the filled ball-mill jar is grinded by the ball-mill at a speed of about 100 to 200 rpm for about 3 to 12 hours. After drying the grinded materials, it is possible to obtain a starting material having a particle size of about 1 to 20 μm.

Step ii) is a step of manufacturing transition alumina by performing heat-treatment on the starting material having a particle size of about 1 to 20 μm.

The transition alumina, which is mixed with molten salts and additives and then heated together, is used in manufacturing flake alpha (α) aluminum oxide which is a purpose of the present invention. The transition alumina has various types such as α, λ, κ, χ, θ and γ-alumina and its crystalline transition step is changed according to temperature and pressure conditions and ultimately, it completely becomes α-alumina at a temperature of about 1,300° C. or higher. Since starting materials, aluminum hydroxide and aluminum salt, are in a form of hydrate, sulfate or the like, bound water ($H_2O$) or bound gas of each material is decomposed in a temperature of about 250 to 400° C. and then the starting materials become various kinds of transition alumina according to the temperature and pressure conditions.

Therefore, the conditions of heat-treatment converting the starting material to the transition alumina should be strict. The heating condition for the heat-treatment converting the starting material to the transition alumina is performed at a rate of about 500 to 900° C./hr, desirably about 600 to 750° C./hr, in a temperature of about room temperature to 250° C.; at a rate of about 150 to 400° C./hr, desirably about 180 to 300° C./hr, in a temperature of about 250 to 400° C.; and at a rate of about 300 to 600° C./hr, desirably about 400 to 500° C./hr, in a temperature of about 400 to 900° C. At the highest range of a set temperature which is designed according to a kind of a starting material, i.e., between about 700 to 900° C., the heat-treatment on the starting material is held for about 60 to 180 minutes and then the starting material is cooled gradually under natural conditions.

Here, a proper proportion of the heat-treated transition alumina is about 60% to 80% of γ-alumina and about 20% to 40% of θ-alumina, κ, χ or the like, which can be analyzed by a X-ray diffraction method.

In the above heat-treated transition alumina, if a proportion of γ-alumina is above 80% or a proportion of κ, χ or θ-alumina is under 20%, alpha(α) crystallinity of flake aluminum oxide which is a final product is improved and a production of twin crystalline particles decreases. But in this case, since a thickness of particles increases, it is possible that its aspect ratio will decrease. Meanwhile, if the proportion of γalumina is under 60% or the proportion of κ, χ or θ-alumina is above 40%, it is possible that it takes more time to alpha-crystallize the flake aluminum oxide which is the final product and the crystallinity thereof will decrease.

In the heat-treatment converting a starting material to the transition alumina, it is important to set a heating rate according to a proportion of each kind of transition alumina and the heating rate is determined and designed in the above-mentioned heating rate range in consideration of an amount of the heat-treatment. If the rate is not in the above-mentioned range, it is possible that desired transition alumina will not be generated.

Furthermore, the heat-treated transition alumina is composed mostly of γ-alumina. Since γ-alumina is a water absorptive material on an unstable condition, after being cooled, it should be sealed up and stored in a dry condition.

Step iii) is a step of mixing the transition alumina manufactured during the above-mentioned Step ii) with molten salt and an additive and then dispersing and grinding the mixture uniformly.

In accordance with the present disclosure, there are two manufacturing methods according to a kind of a compound added to the transition alumina.

First, it is desirable to mix 1 mol of the transition alumina with about 3 to 10 mol of molten salt and about 0.2 to 0.5 mol of a crystal growth agent as an additive.

Second, if 1 mol of the transition alumina is mixed with about 3 to 10 mol of molten salt, about 0.2 to 0.5 mol of a crystal growth agent as an additive and about 0.005 to 0.025 mol of a tin compound as a depositing agent, a deposition property can be improved in a surface of ultrafine particles of flake aluminum oxide due to the addition of the tin compound.

Since a mixed amount of the molten salt used in the present disclosure affects a performance as a solvent and a partial crystal growth, it is appropriate to select the mixed amount in consideration of a post-treatment of recovery after the synthesis is completed. Further, it is desirable that the mixed amount of the molten salt is about 3 to 10 mol with respect to 1 mol of the transition alumina. If the mixed amount of the molten salt is less than 3 mol, there is a likelihood that it will have a bad effect on its role as a solvent and the crystal growth, and if the mixed amount of the molten salt is more than 10 mol, it may have a good effect on its role as a solvent and the partial crystal growth, but it is possible that it will be difficult to perform the post-treatment of recovery after the synthesis is completed.

And it is possible to use one or more of typical molten salt such as calcium carbonate ($CaCO_3$), sodium chloride (NaCl), potassium carbonate ($KCO_3$), potassium sulfate ($K_2SO_4$) and sodium sulfate ($Na_2SO_4$) as a fluxing agent.

Further, it is possible to use a crystal growth additive by selecting and mixing one or more additives according to a type of transition alumina but a total amount of the mixed crystal growth additives is desirable to be about 0.2 to 0.5 mol relative to 1 mol of the transition alumina. If the total amount of the mixed additives is less than 0.2 mol, it is likely that crystal growth will decrease, and if the total amount of the mixed additives is more than 0.5 mol, it is possible that the mixed additives will remain on a crystal particle of flake aluminum oxide finally produced as a foreign substance and also a surface will be broken clue to an exfoliation in a direction of c axis.

It is desirable to use metal salt, metal hydrate, metal fluoride or the like as the additive providing a cause of crystal growth, and the kind thereof can be one or more of typical additives such as LiF, $AlF_3$, NaF, $NaPF_6$, $K_2TiF_6$ and the like.

In addition, the fluoride provides a cause of an aeolotropic crystal growth, and the sodium (Na), the aluminum (Al), the phosphor (P) and the like provide a cause of crystal growth in a direction of c-axis among a, b and c-axes.

Meanwhile, in order for the flake aluminum oxide to have a good use as pearlescent pigment, selected and used is one of $SnSO_4$, $SnI_2$, $SnF_4$, $SnF_2$ and SnO, which are tin-based compounds, so as to improve a whiteness and a deposition property of a surface of a fine particle in comparison with the conventional art so that the deposition property of metal oxide of the fine particle in the surface of flake aluminum oxide is improved.

It is desirable to use about 0.005 to 0.025 mol of a mixed amount of a tin compound serving as a depositing agent with respect to 1 mol of transition alumina. If the mixed amount is less than 0.005 mol, it is likely that an effect according to an addition will be reduced, and if the mixed amount is more than 0.025 mol, an excessive amount of the tin compound will be formed into a fine particle having a size of about several tens to several hundreds nanometer in finally produced powder due to a characteristic of the tin compound, so it will be hard to remove these particles.

As described above, the mixture of transition alumina and molten salt and an additive are dispersed and grinded uniformly. Since the transition alumina prepared from the starting material having its particle distribution controlled, the molten salt and the crystal growth additive have different particle size distributions due to their own properties, if these materials are mixed as they are and synthesized by a heat treatment, crystal growth is non-uniformly proceeded according to a state of a dispersion and a particle size of the additive and the transition alumina, and a lot of twin-crystal particles are generated. Thus, in order to solve such problem, the present disclosure suggests physically dispersing and grinding the mixture.

A high-purity alumina ball-mill jar, which is the same kind of ball-mill jar used for controlling the size of particles of the starting material, is filled with zirconia balls or alumina balls up to about 33 to 70% of the inner volume and the mixture up to about 20 to 40% of the inner volume, and then ethyl alcohol or acetone is added thereto up to about 70 to 90% of the whole inner volume after filling with balls and mixture for a wet grinding. And then, the ball-mill jar is rotated at a speed of about 100 to 200 rpm for about 12 to 72 hours and the ingredient in the ball-mill jar is grinded with a ball-mill. It is more desirable to fill the ball-mill jar with the balls up to about 40 to 60% of the inner volume, the mixture up to about 23 to 33% and the solution up to about 75 to 85% of the whole volume at the state that the ball-mill jar is filled with the balls and the mixture, and perform the grinding by rotating the filled ball-mill jar at a speed of about 120 to 160 rpm for about 24 to 48 hours.

Meanwhile, since a hardness of the molten salt and the additive is lower than that of the transition alumina, if the molten salt and the additive are dispersed and grinded properly and the mixture is dried well, it is possible to obtain powder having a particle size of about 1 to 15 μm.

Step iv) is a step of melting and synthesizing the dispersed and grinded mixture obtained from step iii) by using a microwave as a heating source.

The present disclosure suggests using the microwave as a heating source for melting and synthesizing the transition alumina, the molten salt and the additive. According to this method, it is possible to sharply reduce a synthesis time of flake aluminum oxide and thus improve productivity and an energy efficiency, and further possible to improve a mono-dispersion property of a particle size distribution of the finally manufactured powder.

The method of heating a material with the microwave is performed differently from a typical method with a heating element in an electric furnace in that the material generates a heat by itself caused by a motion of a lattice in the material according to a change in electric field. According to this method, there may not occur a difference in temperature within the heated material. Based on this principle, the microwave has been used in various ways in a field of organic synthesis.

Meanwhile, the microwave has rarely been used for synthesizing inorganic materials to which the present disclosure is related since a magnitude of permittivity of the inorganic material limits the applicability of the microwave.

$$P = \frac{1}{18} f v^2 \in \tan \delta \times 10^{-10} \, (W/m^3)] \quad (1)$$

$$Q = \frac{1}{2}.1 f v^2 \in \tan \delta \times 10^{-8} \, (cal)] \quad (2)$$

Equation (1) shows a power loss to be transformed into a heat by using a dielectric property of the inorganic material and equation (2) shows an amount of calories per unit volume.

In equations (1) and (2), P stands for power; Q for the amount of calorie; f for a frequency; υ for a magnitude of microwave electron; ∈ for a relative dielectric constant; and tan δ for a dielectric loss angle.

The present disclosure provides an application of a microwave as a heating source by studying a material property of an inorganic material. The transition alumina has a low permittivity at a low temperature but has a sharp increase in the permittivity at a high temperature of 600° C., and polar materials are used as molten salt and additive. Therefore, it is easy to perform a dielectric heating therewith.

A microwave frequency used in the present disclosure is 915 MHz.

$$D = \frac{3.32 \times 10^7}{f \sqrt{\varepsilon} \times \tan \delta} (m) \quad (3)$$

Equation (3) represents a valid penetration depth to which microwave energy is transmitted into a material to perform a heating reaction, wherein the depth is defined as a distance from a surface of the material at which a microwave power density falls to 50% of its original value. Here, f stands for a frequency; ∈ for a relative dielectric constant; and tan δ for a dielectric loss angle.

In a laboratory experiment, it is possible to use a microwave at 2.45 GHz because a melting pot is small. However, for heating process for an industrial mass production which is a purpose of the present disclosure, such a microwave is not appropriate because it causes temperature irregularities within a material which result in a low mono-dispersion property of a particle size and a non-uniform aspect ratio due to a limited valid penetration depth.

The mixed materials have a relative dielectric constant ∈ of about 9.5 to 12.4 and a dielectric loss angle tan δ of about 450×10$^{-4}$ to 960×10$^{-4}$ at room temperature according to a mixing proportion. According to a result of calculation using the equation (3) with the relative dielectric constant ∈ and the dielectric loss angle tan δ of the mixed materials, the valid penetration depth is about 4 to 9 cm at a frequency of 2.45 GHz and about 10 to 26 cm at a frequency of 915 MHz. That is, the valid penetration depth of a microwave at 915 MHz is about three times as great as that of a microwave at 2.45 GHz.

Since a highly purified alumina or zirconia crucible used for an industrial mass production typically has a diameter of about 14 cm or more, in case of using the microwave at 2.45 GHz, its short penetration depth may cause temperature irregularities within the heated material which may result in non-uniform particle growth and a low mono-dispersion property of a particle size.

Accordingly, in accordance with the present disclosure, it is possible to solve the above-mentioned problem by using the microwave at 915 MHz and possible to heat and synthesize flake alumina oxide by using a highly energy-efficient industrial microwave.

In accordance with the present disclosure, the mixture of the transition alumina, the molten salt and the additive are molten and synthesized in a highly purified alumina or zirconia crucible by the microwave heating source which is composed of a power supply (magnetron) 1, an isolator 2, a power monitor 3, a tuner 4, an adiabatic material 6 connected with a wave guide 5, a stirrer 7 and a heating cavity 9 to which an infrared rays thermometer is attached as illustrated in FIG. 2.

The heating condition of the microwave heating source is set to have a temperature rising rate of about 420 to 900° C./hr in a temperature of about room temperature to 700° C.; a temperature rising rate of about 180 to 360° C./hr in a temperature of about 701 to 950° C., and held for about 10 to 60 minutes at a temperature of about 950° C. to give sufficient time for the molten salt to melt and to obtain a melting flexibility of the transition alumina and the additive, and then a temperature rising rate of about 60 to 120° C./hr in a temperature of about 951 to 1,250° C. At the highest temperature which is designed according to an amount of the mixture, i.e., at a temperature of about 1,100 to 1,250° C. the heat treatment is held for about 60 to 180 minutes and then a cooling treatment is performed gradually under a natural condition. Here, the heating atmosphere is formed as a typical oxidation atmosphere with a heating crucible having its lid closed.

Desirably, the temperature rising rate is set to be about 540 to 660° C./hr in a temperature of about room temperature to 700° C.; about 240 to 300° C./hr in a temperature of about 701 to 950° C.; and about 60 to 120° C./hr in a temperature of about 951 to 1,250° C. Further, the temperature rising rate is set in consideration of a violent reaction of the mixture caused by a difference in melting point of each material of the mixture, a problem of volatility and a necessary amount of calories corresponding to an amount of synthesis. It is desirable to measure the temperatures with a contactless thermometer (IR thermometer) due to performing a microwave dielectric heating.

The time maintained for about 60 to 180 minutes at the highest designed temperature of about 1,100 to 1,250° C. is a time for the transition alumina to be crystallized into α-alumina, and if the maintained time is less than 60 minutes, it is likely that a crystallinity of α-alumina will decrease, and if the maintained time exceeds 180 minutes, it is likely that a thickness of α-alumina will increase due to an excessive crystal growth and thus an aspect ratio (A/R) of α-alumina will be bad.

In addition, in this case, the crucible should be made of alumina or zirconia which is totally magnetized and highly purified. A limitation on a state and a material of the crucible is purposed to prevent a mixture in a liquid state at a high temperature from being leaked and to prevent the crucible from being cracked.

Step v) is a step of separating the molten salt and the additive from the mixture synthesized during step iv). In other words, after the synthesis is completed, the separation of the molten salt, the additive and a crystal particle of coagulated flake aluminum oxide is performed in step v), and a typical separation method for the molten salt may be used in step v).

The separation method for the molten salt is carried out by putting the synthesized mixture in a crucible into a constant temperature tank filled with water to which an agitator is attached and rotating the agitator to dissolve the molten salt and the additive. As a result, it is possible to separate the crystal particle of the flake aluminum oxide from the mixture. Also, it is possible to obtain the crystal particle of the flake aluminum oxide with a high quality by repeating this process. If the water in the constant temperature water tank is distilled water and maintained in a temperature of about 80 to 100° C., it is possible to obtain the crystal particle more quickly.

Step vi) is a step of making a surface of the crystal particle of the flake aluminum oxide clean and flat by removing foreign substances caused by the additive which are stuck thereto. A typical acid treatment may be used to take this step. Since the flake aluminum oxide is a chemically stable compound, it is possible to select one of sulfuric acid, nitric acid and the like to be suited for the use therein, and use them by properly diluting them.

After the acid treatment is completed as described above, if the flake aluminum oxide is sufficiently neutralized with the diluted water and dried, it is possible to obtain white and transparent crystal powder of the flake aluminum oxide with a good mono-dispersion property having an aspect ratio of about 50 to 415 and a particle size distribution of about 5 to 85 μm.

Hereinafter, a configuration of the present disclosure will be explained in detail with reference to embodiments but is not restricted to the following embodiments.

1. Manufacture of Flake Aluminum Oxide

Embodiment 1

(1) Manufacture of Aluminum Hydroxide Powder 618.5 g of aluminum hydroxide powder (Showa Denko, Japan) having a size of about 10 to 53 μm, which is obtained by using a sieve having a mesh size of about 53 μm and a sieve having a mesh size of about 10 μm, is put into a highly purified alumina ball mill jar having a capacity of about 2.2 l, and 2,637 g of alumina ball having a diameter of about 7 mm is put into the alumina ball mill jar, and then the aluminum hydroxide powder was ball-milled at a speed of about 150 rpm for 6 hours. After that, the ball-milled powder is dried in a drier at a temperature of about 80° C. for 12 hours. As a result, it is possible to obtain aluminum hydroxide powder with an average particle size of about 1 to 20 μm which is a precursor of transition alumina.

(2) Manufacture of Transition Alumina

The aluminum hydroxide powder which is manufactured in step (1) is heated in a box-shaped electric furnace, to which a thermo regulator is attached, with SiC heating element at a rate of 600° C./hr in a temperature of room temperature to 250° C.; at a rate of 200° C./hr in a temperature of about 251 to 400° C.; and at a rate of 400° C./hr in a temperature of about 401 to 850° C. and here, the heat-treatment is held for 120 minutes and then the heated alumina hydroxide powder is cooled under a natural condition. As a result, it is possible to manufacture the transition alumina.

(3) Manufacture of Dry Powder 1 mol of the transition alumina powder which is manufactured in step (2) is put into an alumina jar having a capacity of about 2.2 l, and added with 7 mol of sodium sulfate ($Na_2SO_4$) as molten salt and 0.048 mol of $AlF_3$, 0.009 mol of $NaPF_6$, 0.428 mol of NaF, and 0.009 mol of $P_2(SO_4)_3$ as a crystal growth agent and a tin compound such as 0.005 mol of $SnF_4$ for improving a deposition property of nanoparticles, and further added with 700 ml of ethyl alcohol and 2 kg of alumina balls, and then ball-milled and grinded at a speed of about 150 rpm for 24 hours. The ball-milled mixture is dried in a drier at a temperature of 90° C. for 24 hours, and then the ball is separated from the dry mixture through a 60 mesh sieve. As a result, it is possible to obtain dry powder having a particle size of about 1 to 15 μm.

(4) Heating for Crystal Growth

The dry powder which is manufactured in step (3) is put into an alumina crucible and heated in a microwave heating device including: a hexahedral cavity, in which a high power industrial and variable magnetron with a maximum power of 5000 W at an oscillating frequency of 915 MHz (Richardson Electronics, NL10257, U.S.A.) is installed; a waveguide and a tuner for uniformly irradiating a microwave; and an infrared rays thermometer (Raytek, 3iG5, U.S.A.) for controlling a temperature, at a rate of 540° C./hr in a temperature of about room temperature to 700° C.; and at a rate of 240° C./hr in a temperature of about 701 to 950° C. and here, the heat-treatment is held for 60 minutes and the dry powder is heated again at a rate of 60° C./hr in a temperature of about 951 to 1,200° C. and here, the heat-treatment is held again for 180 minutes to change crystal to the flake α-aluminum and then the dry powder is cooled to room temperature under a natural condition.

(5) Manufacture of Flake Aluminum Oxide

After the crystal growth is completed, the crucible is cooled to room temperature. The cooled crucible is put into a jar with 5 l of diluted water at a temperature of 80° C. and ingredients in the crucible are stirred with a crossed agitator to sufficiently dissolve the molten salt and the additive, and then the flake aluminum oxide powder, the dissolved molten salt and the additive are filtered with a vacuum filter three times to separate these materials from each other. After being sufficiently washed, the flake aluminum oxide powder is put into a mixture acid liquid mixed with water, sulfuric acid and nitric acid at a ratio of 5:1:1, and left for 3 hours, and then neutralized and washed by diluted water. Then, sufficiently dried up to a constant amount at a temperature of 90° C. As a result, it is possible to obtain 97 g of white flake aluminum oxide.

Embodiment 2

(1) Heating for Crystal Growth

Aluminum hydroxide powder, transition alumina and dry powder are manufactured in the same manner performed in Embodiment 1 and the dry powder is heated in the same microwave heating device used in Embodiment 1 at a rate of 660° C./hr in a temperature of about room temperature to 700° C.; at a rate of 300° C./hr in a temperature of about 701 to 950° C. and here, the heat-treatment is held for 10 minutes and further the dry powder is heated again at a rate of 120° C./hr in a temperature of about 951 to 1,200° C. and here, the heat-treatment is held for 60 minutes to change crystal to the flake α-aluminum and then the dry powder is cooled to room temperature under a natural condition. But here, there is an increase in the amount of the tin compound $SnF_4$ to 0.025 mol which is added to improve a deposition property of the nanoparticle while manufacturing the dry powder in Embodiment 1.

(2) Manufacture of Flake Aluminum Oxide

The same process performed in Embodiment 1 is performed on the synthesized ingredients in the crucible in step (1) such as separating the crystal, washing and drying. As a result, it is possible to obtain 97 g of white flake aluminum oxide.

Embodiment 3

(1) Heating for Crystal Growth

Aluminum hydroxide powder, transition alumina and dry powder are manufactured in the same manner performed in Embodiment 1 and the dry powder is heated in the same microwave heating device used in Embodiment 1 under the same conditions as in Embodiment 1 to change crystal to the flake α-aluminum and then cooled to room temperature under a natural condition. Here, there is no addition of the tin compound $SnF_4$ which is added to improve a deposition property of the nanoparticle while manufacturing the dry powder in Embodiment 1.

(2) Manufacture of Flake Aluminum Oxide

The same process performed in Embodiment 1 is performed on the synthesized ingredients in the crucible in step (1) such as separating the crystal, washing and drying. As a result, it is possible to obtain 97 g of white flake aluminum oxide.

Embodiment 4

(1) Heating for Crystal Growth

Aluminum hydroxide powder, transition alumina and dry powder are manufactured in the same manner performed in Embodiment 1 and the dry powder is heated in the same microwave heating device used in Embodiment 2 under the same conditions as in Embodiment 2 to change crystal to the flake α-aluminum and then cooled to room temperature under a natural condition. Here, there is no addition of the tin compound $SnF_4$ which is added to improve a deposition property of the nanoparticle while manufacturing the dry powder in Embodiment 1.

(2) Manufacture of Flake Aluminum Oxide

The same process performed in Embodiment 1 is performed on the synthesized ingredients in the crucible in step (1) such as separating the crystal, washing and drying. As a result, it is possible to obtain 97 g of white flake aluminum oxide.

Comparison Example 1

(1) Heating for Crystal Growth

Aluminum hydroxide powder, a transition alumina and dry powder are manufactured in the same manner performed in Embodiment 1 and the dry powder is put into an alumina crucible and heated in a microwave heating device including: a hexahedral cavity, in which a high power industrial and variable magnetron with a maximum power of 3000 W at an oscillating frequency of 2.45 GHz (Richardson Electronics, NL10257, U.S.A.) is installed; a waveguide and a tuner for uniformly irradiating a microwave; and an infrared rays thermometer (Raytek, 3iG5, U.S.A.) for controlling a temperature, at a rate of 540° C./hr in a temperature of about room temperature to 700° C.; and at a rate of 240° C./hr in a temperature of about 701 to 950° C. and here, the heat-treatment is held for 60 minutes and the dry powder is heated again at a rate of 60° C./hr in a temperature of about 951 to 1,200° C. and here, the heat-treatment is held again for 180 minutes to change crystal to the flake α-aluminum and then the dry powder is cooled to room temperature under a natural condition.

(2) Manufacture of Flake Aluminum Oxide

The same process performed in Embodiment 1 is performed on the synthesized ingredients in the crucible in step (1) such as separating the crystal, washing and drying. As a result, it is possible to obtain 97 g of white flake aluminum oxide.

Comparison Example 2

(1) Manufacture of Transition Alumina

In order to manufacture transition alumina which is flake aluminum oxide precursor, 1 kg of aluminum hydroxide is put into an alumina crucible and heated in an electric furnace at a rate of 600° C./hr up to a temperature of 900° C. and the heat-treatment is held for 180 minutes and then the aluminum hydroxide is cooled to room temperature under a natural condition. As a result, it is possible to obtain the transition alumina.

(2) Manufacture of Dry Powder

The transition alumina manufactured by the manner of step (1) is mixed with molten salt and an additive and then heated and synthesized under the same conditions as in Embodiment 1 in order to manufacture dry powder.

(3) Heating for Crystal Growth

The dry powder manufactured in step (2) is put into an alumina crucible and heated in an electric furnace at a rate of 300° C./hr up to a temperature of 1,300° C. and the heat-treatment is held for 180 minutes and then the dry powder is cooled to room temperature under a natural condition.

(4) Manufacture of Flake Aluminum Oxide

The same process performed in Embodiment 1 is performed on the synthesized ingredients in the crucible in step (3) such as separating the crystal, washing and drying. As a result, it is possible to obtain 97 g of white flake aluminum oxide.

2. Analysis Method

In order to confirm properties of the flake aluminum oxide manufactured from each Embodiment 1 to 4 and Comparison Example 1 to 2 as described above, a particle shape was observed by a SEM; an average particle size and a particle size distribution were measured by a laser scattering particle size analyzer (PSA); a crystal phase of a synthesized material was observed by an X-ray diffractometer (XRD); and after synthesizing pearlescent pigment by a hydrolysis method, a deposition property of a nanoparticle in a surface of the particle was observed by SEM. The results are listed in [Table 1] as follows.

TABLE 1

| Item | Embodiment 1 | Embodiment 2 | Embodiment 3 | Embodiment 4 | Comparison Example 1 | Comparison Example 2 |
|---|---|---|---|---|---|---|
| Particle size(Average) (μm) | 5~85 (26) | 5~81 (24) | 5~81 (24) | 4~75 (23) | 1~93 (22) | 1~132 (20) |
| Thickness (size distribution) (μm) | 0.1~0.5 (0.2) | 0.1~0.5 (0.2) | 0.1~0.5 (0.3) | 0.1~0.5 (0.2) | 0.1~0.8 (0.5) | 0.2~1.2 (0.7) |
| Aspect ratio (Average) | 50~415 (130) | 55~270 (120) | 50~270 (80) | 50~250 (115) | 10~180 (44) | 5~132 (29) |
| Multi-crystal/ | 4 | 3 | 4 | 3 | 7 | 15 |

TABLE 1-continued

| Item | Embodiment 1 | Embodiment 2 | Embodiment 3 | Embodiment 4 | Comparison Example 1 | Comparison Example 2 |
|---|---|---|---|---|---|---|
| Twin-crystal (%) | | | | | | |
| Crystal phase | α-Al$_2$O$_3$ | α-Al$_2$O$_3$ | α-Al$_2$O$_3$ | α-Al$_2$O$_3$ | α-Al$_2$O$_3$ | α-Al$_2$O$_3$ |
| Dropout rate of deposited TiO$_2$ particle (%) | 7 | 4 | 12 | 16 | 17 | 29 |

3. Analysis Result

As can be seen in [Table 1], all the synthesized powder obtained from Embodiments 1 to 4 and Comparison Example 1 have a plate-shaped particle with a high aspect ratio, and an average particle size and the aspect ratio of the synthesized powder from each case are indicated in order as follows: Embodiment 1>Embodiment 2>Embodiment 4>Embodiment 3>>Comparison Example 1>Comparison Example 2.

Referring to photographs of the SEM with respect to Embodiment 1 (FIG. 3) and Embodiment 3 (FIG. 4), Embodiment 1 (FIG. 3) represents a case that a SnF$_4$ compound which is a tin compound is added and a magnetron with a maximum power of 5000 W at an oscillating frequency of 915 MHz is installed, and the particle size is uniform, and multi-crystal and twin-crystal rarely exist therein, and the average particle size is about 26 μm. Meanwhile, Embodiment 3 (FIG. 4) is performed with the same heating device under the same condition as in Embodiment 1 (FIG. 3) but the tin compound SnF$_4$ is not added. Accordingly, flake aluminum oxide from Embodiment 3 has a non-uniform particle size and little of multi-crystal and twin crystal exist therein in comparison with Embodiment 1 (FIG. 3), and the average particle size is about 24 μm. Accordingly, it is deemed that the tin compound SnF$_4$ has somewhat effects on a particle size of the added materials. Meanwhile, in case of Comparison Example 2, by referring to a photograph of the SEM (FIG. 6), since a manufacturing process is performed differently from other Embodiments and the tin compound SnF$_4$ is not added during the process, large particles and small ones are mixed together, and the multi-crystal and the twin crystal exist in large quantity and an average particle size is about 20 μm. And a synthesis process of Comparison Example 1 (FIG. 5), is performed under the same condition as in Embodiment 3 but with a microwave heating device having a frequency of 2.45 GHz. So in comparison with Embodiment 3, an average particle size is somewhat decreased to 23 μm but the particle is thick and multi-crystal and twin crystal are somewhat contained therein.

In addition, in order to check whether or not the deposition property of a TiO$_2$ nanoparticle is improved due to an addition of the tin compound SnF$_4$, the pearlescent pigment is synthesized by the hydrolysis method. The deposition property of the nanoparticle on a surface of a particle is observed by the SEM, and as a result, it is found that on a product (FIG. 7) coated with a SnF$_4$-contained base material obtained from Embodiment 1, the TiO$_2$ particles are very uniformly and densely deposited, so the product has a nice deposition property. Meanwhile, on a product (FIG. 8) coated with a base material not containing SnF$_4$ compound obtained from Embodiment 3, the TiO$_2$ particles are uniformly coated and the surface of the product is a little peeled. In comparison with the above-described cases, Comparison Example 2 is different from Embodiment 1 and Embodiment 3 in a manufacturing process and an addition of the tin compound SnF$_4$. So a product from Comparison Example 2 (FIG. 9) is non-uniformly coated with the TiO$_2$ particles and the peeling can be found in many parts of the surface.

In accordance with the particle size analysis on the particles obtained from Embodiment 3 (FIG. 10) and Embodiment 4 (FIG. 11), these two Embodiments are performed differently from each other as follows. Under a condition that an increase of a temperature rising rate per hour is low and a hold time at a final temperature is long, the particle from Embodiment 3 (FIG. 10) has a uniform particle size distribution and an average particle size is big having the size of about 24 μm. Even though Embodiment 4 (FIG. 11) is manufactured with a mixture having the same mixing proportion as in Embodiment 3, the particle from Embodiment 4 has a wider particle size distribution and a smaller average particle size of about 23 μm because the temperature rising rate is relatively fast and the hold time at the final temperature is relatively short in comparison with Embodiment 3. As can be seen in Table 1, the results of analysis on Embodiment 1 and Embodiment 2 show the same tendency as in Embodiment 3 and Embodiment 4. However, in accordance with the particle size analysis (FIG. 12) with respect to Comparison Example 2, the particle has a wide particle size distribution and a small average particle size of about 20 μm according to different conditions from the other cases, such as the manufacturing process and a heating method.

As described above, the properties of the present invention are proven excellent enough through the above-described embodiments but it should be noted that the present invention is not limited to the embodiments but can be realized in various other ways within a scope of the subject matter claimed in the present invention.

INDUSTRIAL APPLICABILITY

In a conventional method of synthesizing flake aluminum oxide, it is insufficient in controlling a proper particle size and dispersion property with respect to a starting material and a mixture of molten salt and an additive, so there exist a lot of multi-crystals and twin-crystals in synthesized powder after a completion of synthesis. Meanwhile, in accordance with the present disclosure, the proportion of multi-crystal and twin-crystal in a synthesized powder particle is reduced to less than 5% by achieving a particle distribution of the starting material, a particle distribution with respect to the mixture and a complete dispersion with respect to the additive.

Further, in accordance with the present disclosure, since a microwave is used in synthesizing flake aluminum oxide as a heating source and a material generates heat by itself due to a selective heating and a bulk exothermic property, in comparison with a typical method, a difference of a heating temperature distribution is small and it is possible to synthesize at a lower final temperature by 100° C. or more than a typical method, so it is possible to make a synthesized process which has a good mono-dispersion property of a finally synthesized particle distribution and a high energy efficiency.

Further, it is a merit of the present disclosure to make improved pearlescent pigment by enhancing a deposition property of $TiO_2$ nanoparticle when synthesizing the pearlescent pigment by adding a new tin compound in order to improve a deposition property with respect to a surface of a particle of the flake aluminum oxide to be used for a base material of the pearlescent pigment.

The invention claimed is:

1. A method of manufacturing flake aluminum oxide using a microwave, comprising:
grinding alumina hydrate or aluminum salt and then classifying particles having a size of about 5 to 50 μm to form a pre-treated starting material;
heating the pre-treated starting material to form a transition alumina;
mixing the transition alumina with one or more molten salts selected from the group consisting of calcium carbonate, sodium chloride, potassium carbonate, potassium sulfate and sodium sulfate, and one or more additives selected from the group consisting of LiF, $AlF_3$, NaF, $NaPF_6$ and $K_2TiF_6$ to form a mixture, and then dispersing and grinding the mixture;
heating the dispersed and ground mixture with a microwave heating source at a frequency of 915 MHz to melt and synthesize a flake aluminum oxide;
separating the molten salt and the additive from the synthesized flake aluminum oxide to obtain a separated synthesized flake aluminum oxide; and
post-treating the separated synthesized flake aluminum oxide by removing any additive residue on a surface of a crystal particle of the separated synthesized flake aluminum oxide.

2. The method of claim 1, wherein the aluminum hydrate is aluminum hydroxide, and the aluminum salt is selected from the group consisting of aluminum sulfate, aluminum nitrate and aluminum acetate.

3. The method of claim 1, wherein the heating the pre-treated starting material is performed at a rate of about 500 to 900° C./hr in a temperature range of room temperature to 250° C. at a rate of about 150 to 400° C./hr in a temperature range of about 250 to 400° C. and at a rate of about 300 to 600° C./hr in a temperature range of about 400 to 900° C. and maintained at a temperature range of about 700 to 900° C. for 60 to 180 minutes, and then gradually cooled.

4. The method of claim 1, wherein the dispersed and ground mixture is made by mixing about 1 mol of the transition alumina with about 3 to 10 mol of the molten salt and about 0.2 to 0.5 mol of a crystal growth agent as the additive.

5. The method of claim 1, wherein the dispersed and ground mixture is made by mixing about 1 mol of the transition alumina with about 3 to 10 mol of the molten salt, about 0.2 to 0.5 mol of the additive and about 0.005 to 0.025 mol of a tin compound.

6. The method of claim 5, wherein the tin compound is one selected from the group consisting of $SnSO_4$, $SnI_2$, $SnF_4$, $SnF_2$ and SnO.

7. The method of claim 1, wherein the heating the dispersed and ground mixture is performed at a rate of about 420 to 900° C./hr in a temperature range of about room temperature to 700° C. at a rate of about 180 to 360° C./hr in a temperature range of about 701 to 950° C. at a rate of about 60 to 120° C./hr in a temperature range of about 951 to 1,250° C. and maintained at a temperature range of about 1,100 to 1,250° C. for about 60 to 180 minutes, and then gradually cooled.

* * * * *